US012621200B2

(12) United States Patent
Hu et al.

(10) Patent No.: US 12,621,200 B2
(45) Date of Patent: May 5, 2026

(54) SIGNALING AND PADDING METHODS FOR PROBABILISTIC SHAPING QAM TRANSMISSION IN WIRELESS COMMUNICATIONS

(71) Applicant: MediaTek Inc., Hsinchu City (TW)

(72) Inventors: Shengquan Hu, San Jose, CA (US);
Jianhan Liu, San Jose, CA (US);
Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 294 days.

(21) Appl. No.: 18/370,863

(22) Filed: Sep. 20, 2023

(65) Prior Publication Data

US 2024/0106691 A1 Mar. 28, 2024

Related U.S. Application Data

(60) Provisional application No. 63/376,630, filed on Sep. 22, 2022.

(51) Int. Cl.
*H04L 27/36* (2006.01)
(52) U.S. Cl.
CPC ................................. *H04L 27/362* (2013.01)

(58) Field of Classification Search
None
See application file for complete search history.

(56) References Cited

U.S. PATENT DOCUMENTS

| | | | |
|---|---|---|---|
| 2021/0084654 A1* | 3/2021 | Yang | H04L 1/0046 |
| 2021/0099249 A1* | 4/2021 | Li | H04W 72/04 |
| 2021/0160843 A1 | 5/2021 | Yang et al. | |
| 2021/0243058 A1 | 8/2021 | Doan et al. | |

OTHER PUBLICATIONS

European Patent Office, Extended European Search Report in European Patent Application No. 23198758.7, Feb. 15, 2024.

* cited by examiner

*Primary Examiner* — Diane L Lo
(74) *Attorney, Agent, or Firm* — Andy M. Han; Han IP PLLC

(57) ABSTRACT

Techniques pertaining to signaling and padding methods for probabilistic shaping quadrature amplitude modulation (QAM) transmission in wireless communications are described. An apparatus (e.g., station (STA)) generates a packet using a probabilistic shaping (PS) 4096 quadrature amplitude modulation (4096QAM) such that a length of the packet is extended. The apparatus then transmits the packet in a wireless communication.

15 Claims, 10 Drawing Sheets

900

GENERATE, BY A PROCESSOR OF AN APPARATUS, A PACKET USING A PROBABILISTIC SHAPING (PS) 4096 QUADRATURE AMPLITUDE MODULATION (4096QAM) SUCH THAT A LENGTH OF THE PACKET IS EXTENDED

910

TRANSMIT, BY THE PROCESSOR, THE PACKET IN A WIRELESS COMMUNICATION

920

100

STA
120

WIRELESS COMMUNICATIONS WITH SIGNALING AND PADDING METHODS FOR
PROBABILISTIC SHAPING (PS) QUADRATURE AMPLITUDE MODULATION (QAM)
TRANSMISSION

STA
110

Figure 9:
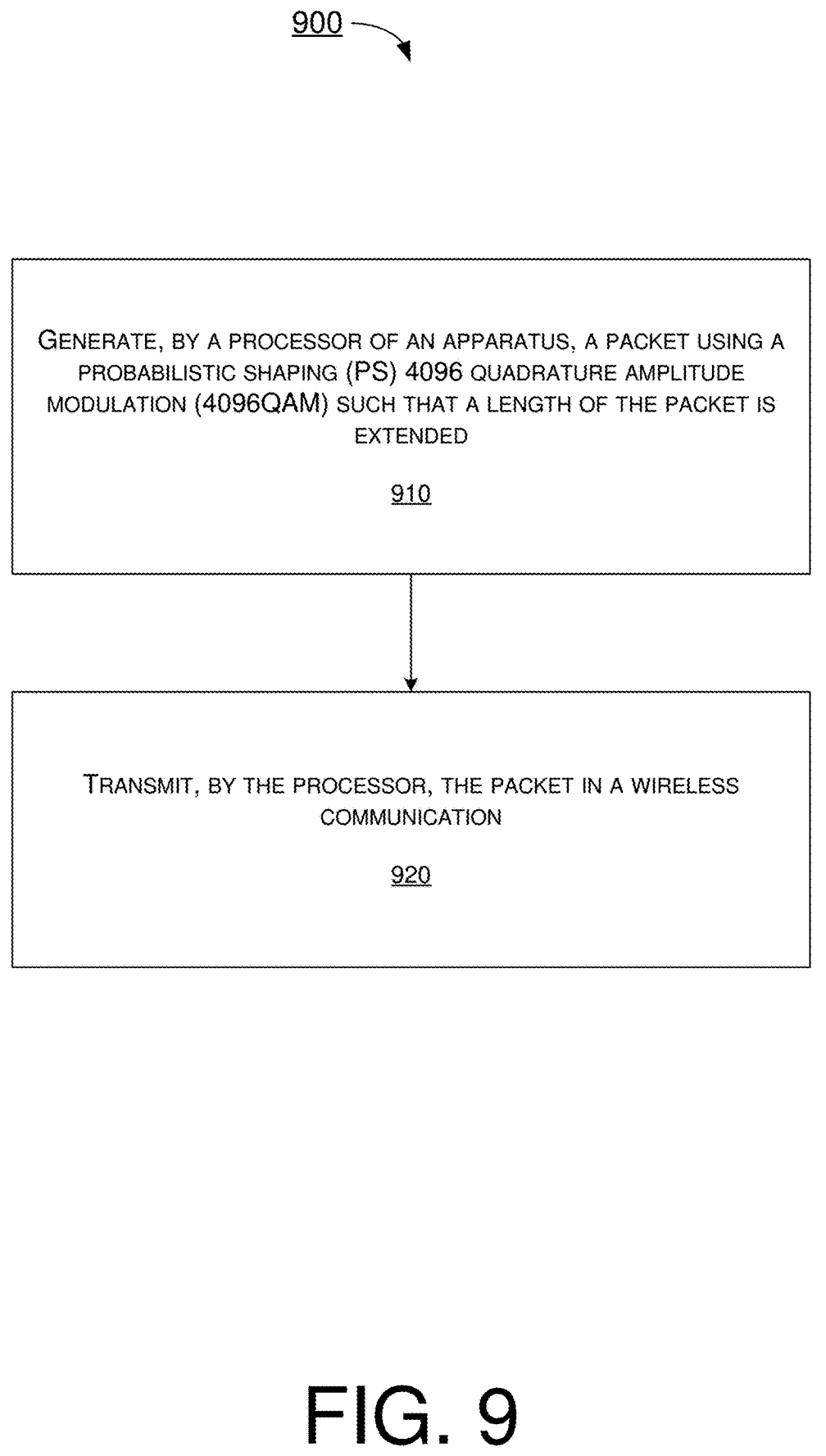

900 ⟶

GENERATE, BY A PROCESSOR OF AN APPARATUS, A PACKET USING A PROBABILISTIC SHAPING (PS) 4096 QUADRATURE AMPLITUDE MODULATION (4096QAM) SUCH THAT A LENGTH OF THE PACKET IS EXTENDED

910

TRANSMIT, BY THE PROCESSOR, THE PACKET IN A WIRELESS COMMUNICATION

Figure 10:
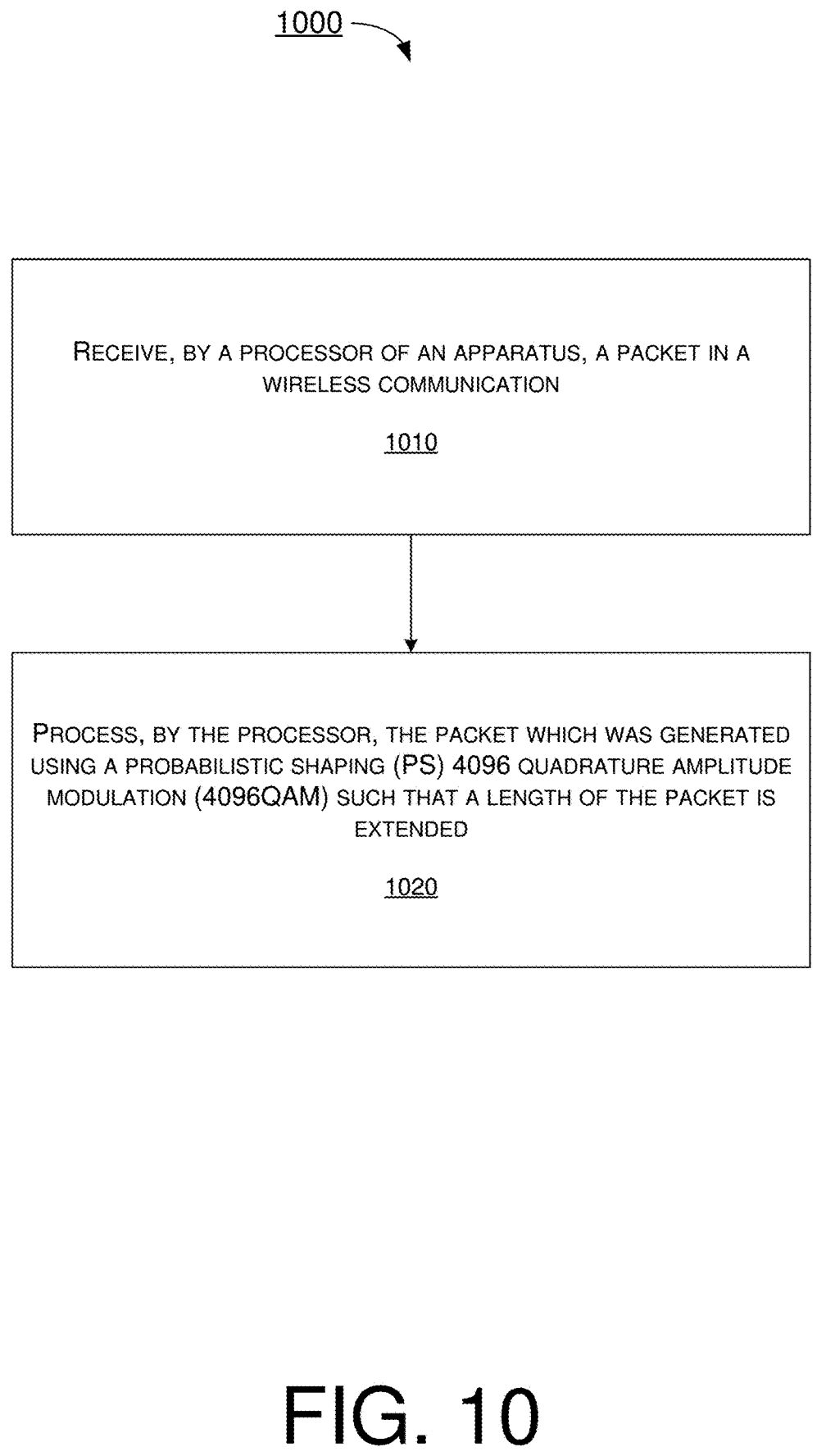

RECEIVE, BY A PROCESSOR OF AN APPARATUS, A PACKET IN A
WIRELESS COMMUNICATION

1010

PROCESS, BY THE PROCESSOR, THE PACKET WHICH WAS GENERATED
USING A PROBABILISTIC SHAPING (PS) 4096 QUADRATURE AMPLITUDE
MODULATION (4096QAM) SUCH THAT A LENGTH OF THE PACKET IS
EXTENDED

SIGNALING AND PADDING METHODS FOR PROBABILISTIC SHAPING QAM TRANSMISSION IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/376,630, filed 22 Sep. 2022, the content of which herein being incorporated by reference in its entirety.

TECHNICAL FIELD

The present disclosure is generally related to wireless communications and, more particularly, to signaling and padding methods for probabilistic shaping quadrature amplitude modulation (QAM) transmission in wireless communications.

BACKGROUND

Unless otherwise indicated herein, approaches described in this section are not prior art to the claims listed below and are not admitted as prior art by inclusion in this section.

In wireless communications such as Wi-Fi (or WiFi) in accordance with the Institute of Electrical and Electronics Engineers (IEEE) 802.11 standards, 4096QAM has been adopted in IEEE 802.11 be and is designed to increase about 20% in data rate compared to 1024QAM. Probabilistic shaping (PS) type 4096QAM can provide about 1.5 dB to 2 dB gain compared with the regular, uniformly-distributed 4096QAM under the same effective data rate consideration. However, PS mapper tends to result in varying lengths of output bits sequence, and the issue of varying lengths causes difficulties in at least signaling and padding. Therefore, there is a need for a solution of signaling and padding methods for probabilistic shaping QAM transmission in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to signaling and padding methods for probabilistic shaping QAM transmission in wireless communications. It is believed that implementations of various proposed schemes in accordance with the present disclosure may alleviate or otherwise address the issue(s) described herein. Signaling and padding mechanisms under the proposed schemes may be able to handle the issue of varying lengths of PS-4096QAM (hereinafter interchangeably referred to as "PS-4KQAM"). Moreover, modulation and coding scheme (MCS) options under the proposed schemes may support both regular 4096QAM and PS-4096QAM, thereby offering flexibilities in implementation-friendly solutions and performance-oriented solutions.

In one aspect, a method may involve generating a packet using PS-4096QAM such that a length of the packet is extended. The method may also involve transmitting the packet in a wireless communication.

In another aspect, a method may involve receiving a packet in a wireless communication. The method may also involve processing the packet which was generated using PS-4096QAM such that a length of the packet is extended.

In yet another aspect, an apparatus may include a transceiver configured to communicate wirelessly and a processor coupled to the transceiver. The processor may generate a packet using PS-4096QAM such that a length of the packet is extended. The processor may also transmit the packet in a wireless communication.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 9 is a flowchart of an example process in accordance with an implementation of the present disclosure.

FIG. 10 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to signaling and padding methods for probabilistic shaping QAM transmission in wireless communications. According to the present disclosure, a number of possible solutions may be implemented separately or jointly. That is, although these possible solutions may be described below separately, two or more of these possible solutions may be implemented in one combination or another.

Figure 1:
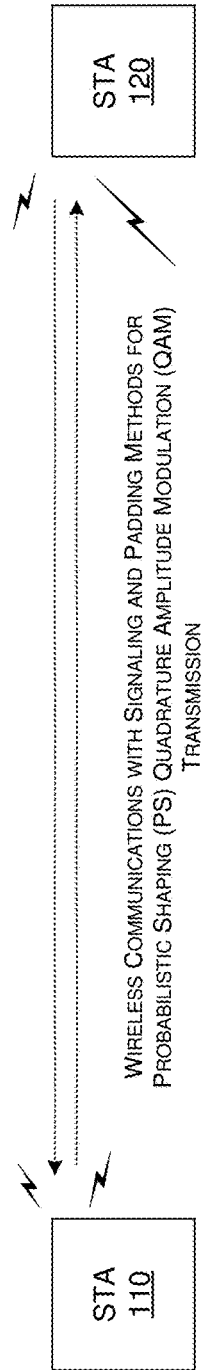
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 10 illustrate examples of implementation of various proposed schemes in network environment 100 in accordance with the present disclosure. The following description of various proposed schemes is provided with reference to FIG. 1~FIG. 10.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the signaling and padding methods for probabilistic shaping QAM in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
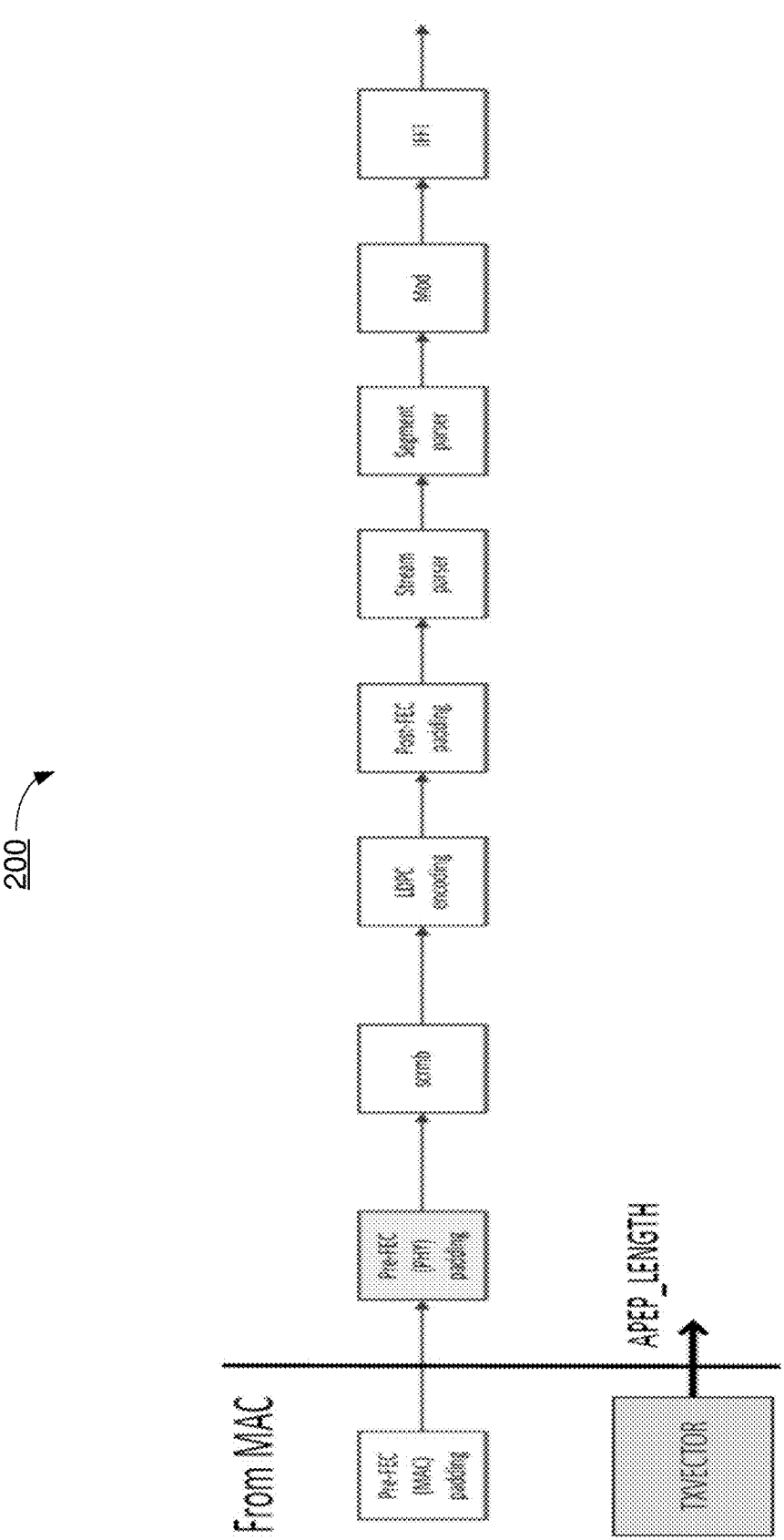
FIG. 2 is a diagram of an example scenario under a proposed scheme in accordance with the present disclosure.

FIG. 2 illustrates an example scenario 200 of a processing flow with regular non-PS QAM. More specifically, scenario 200 shows an example of length signaling and padding processing in IEEE 802.11ax/be or future Wi-Fi 802.11bn system. At the transmission (TX) side, the physical layer (PHY) of a transmitter uses the aggregate medium access control (MAC) protocol data unit (A-MPDU) pre-end of frame (pre-EOF) padding (APEP) length (APEP_LENGTH) from a transmission vector (TXVECTOR) and other parameters to calculate the number of symbols ($N_{sym}$) and padding parameters (such as a-factor, pre-forward error correction (pre-FEC) and post-FEC padding, and so on). The PHY also uses $N_{sym}$ and other parameters to calculate the transmission time (TXTIME). Moreover, the PHY calculates a total length, LENGTH, based on TXTIME, and the PHY signals the LENGTH in the legacy signal (L-SIG) field. At the reception (RX) side, the PHY of a receiver decodes L-SIG and high-efficiency signal (HE-SIG) field or extreme-high throughput signal (EHT-SIG) field or ultra-high reliability signal (UHR-SIG) field to obtain legacy length (L_LENGTH), a-factor, and so on. The PHY also calculates $N_{sym}$ from L_LENGTH and then calculates a physical layer convergence protocol (PLCP) service data unit (PSDU) length (PSDU_LENGTH) from $N_{sym}$.

Figure 3:
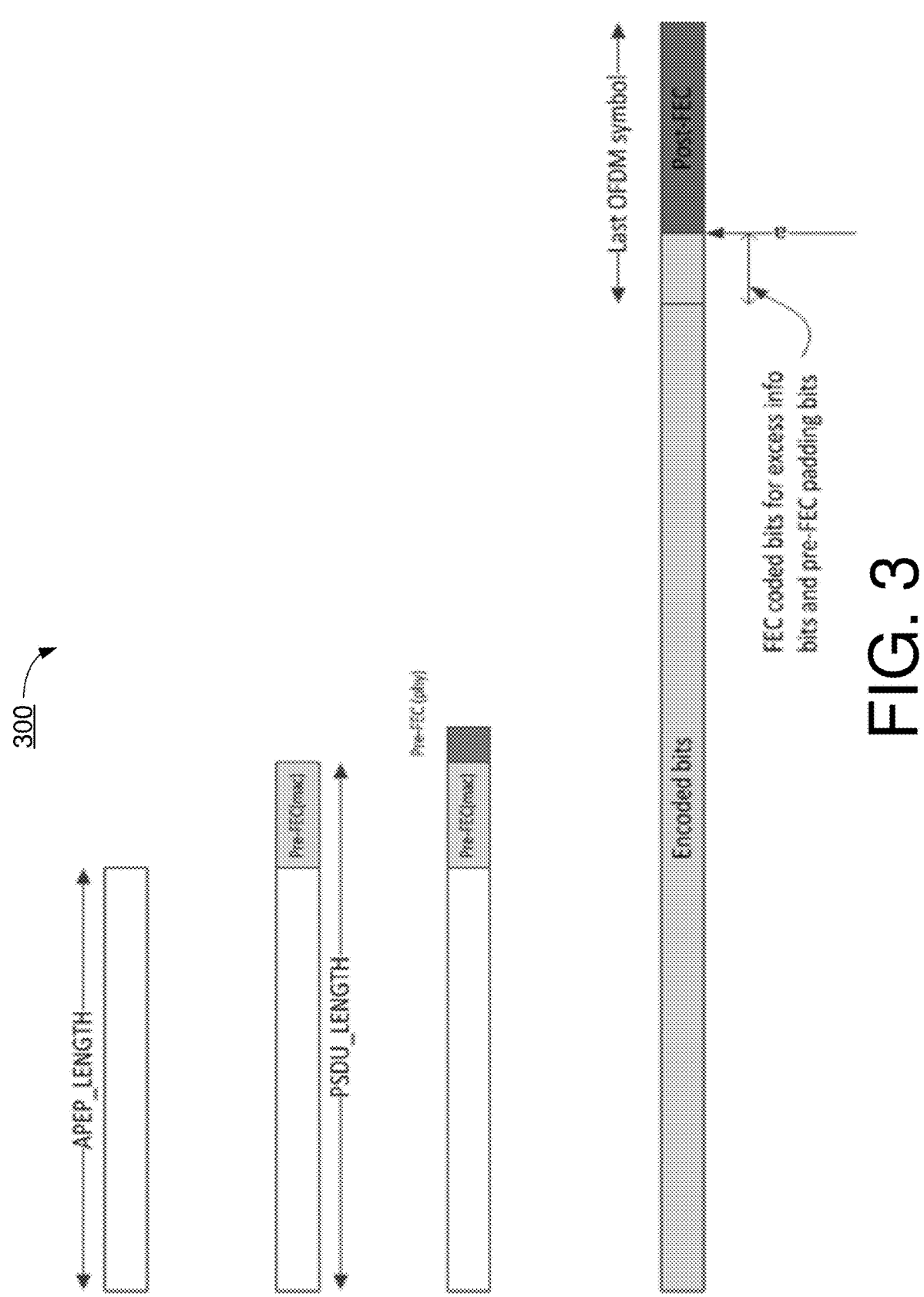
FIG. 3 is a diagram of an example scenario under a proposed scheme in accordance with the present disclosure.

FIG. 3 illustrates an example scenario 300 of a padding process for regular non-PS QAM. As shown in FIG. 3, a payload may start from a length equal to APEP_LENGTH and then be padded at the MAC layer with pre-FEC padding (denoted as "Pre-FEC (MAC)" in FIG. 3), to result in a packet with a length of PSDU_LENGTH. At the PHY layer, additional pre-FEC padding may be performed (denoted as "Pre-FEC (PHY)" in FIG. 3). With encoding performed at PHY, the packet may contain encoded bits, including FEC coded bits for excess information bits and pre-FEC padding bits as well as post-FEC padding bits.

As can be seen, probabilistic shaping modulation inevitably introduces the issue of varying length. For PS-4096QAM, one key module is a probabilistic shaping mapper (PS mapper). This PS mapper results in varying length of output sequences even for an input sequence with a given length. From simulations conducted by the inventors of the present disclosure, it can be observed that, relative to the length of the input sequence, the varying length of the outputs of the PS mapper typically increases by about 9%~12% (statistically) of an original length. For regular non-PS QAM, the L_LENGTH and other parameters may be calculated once the packet length is configured. However, the actual transmission packet length can only be known by PS modulation after the PS mapper. As such, it would be too late to calculate L_LENGTH and set the calculated value in L_SIG if waiting for PS mapping to be done.

Figure 4:
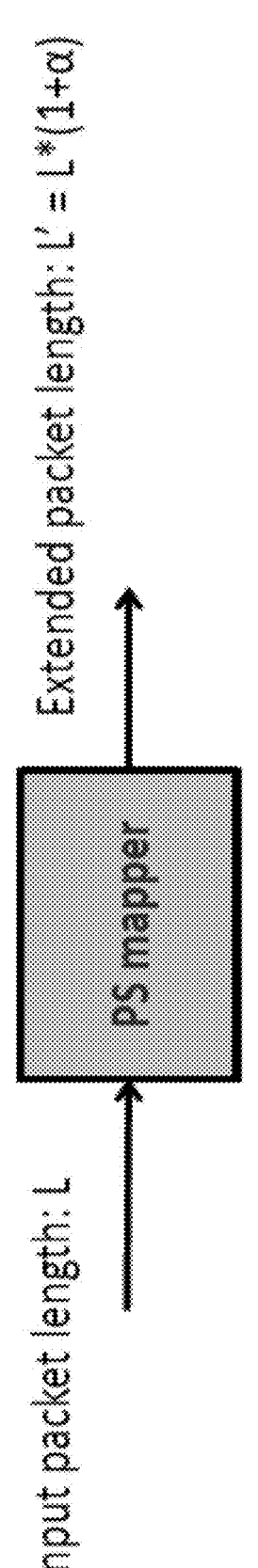
FIG. 4 is a diagram of an example scenario under a proposed scheme in accordance with the present disclosure.

FIG. 4 illustrates an example scenario 400 under a proposed scheme in accordance with the present disclosure. Under the proposed scheme, a concept of "extended" packet length may be utilized in PS-QAM. This "extended" packet length may be predicted, calculated or otherwise determined based on a parameter "α", which may be programmable/configurable or fixed. This parameter α may represent the percentage of "possible" increase of packet length after PS mapping relative to the length of the input sequence. For instance, the parameter α may be configured with any value in the range of 9%~12% of an original length of the packet or PSDU, which is obtained statistically from simulations. Referring to FIG. 4, in case that the input sequence has a length of L, after processing by a PS mapper under the proposed scheme, the extended packet length L' may be expressed as: $L'=L*(1+\alpha)$.

Figure 5:
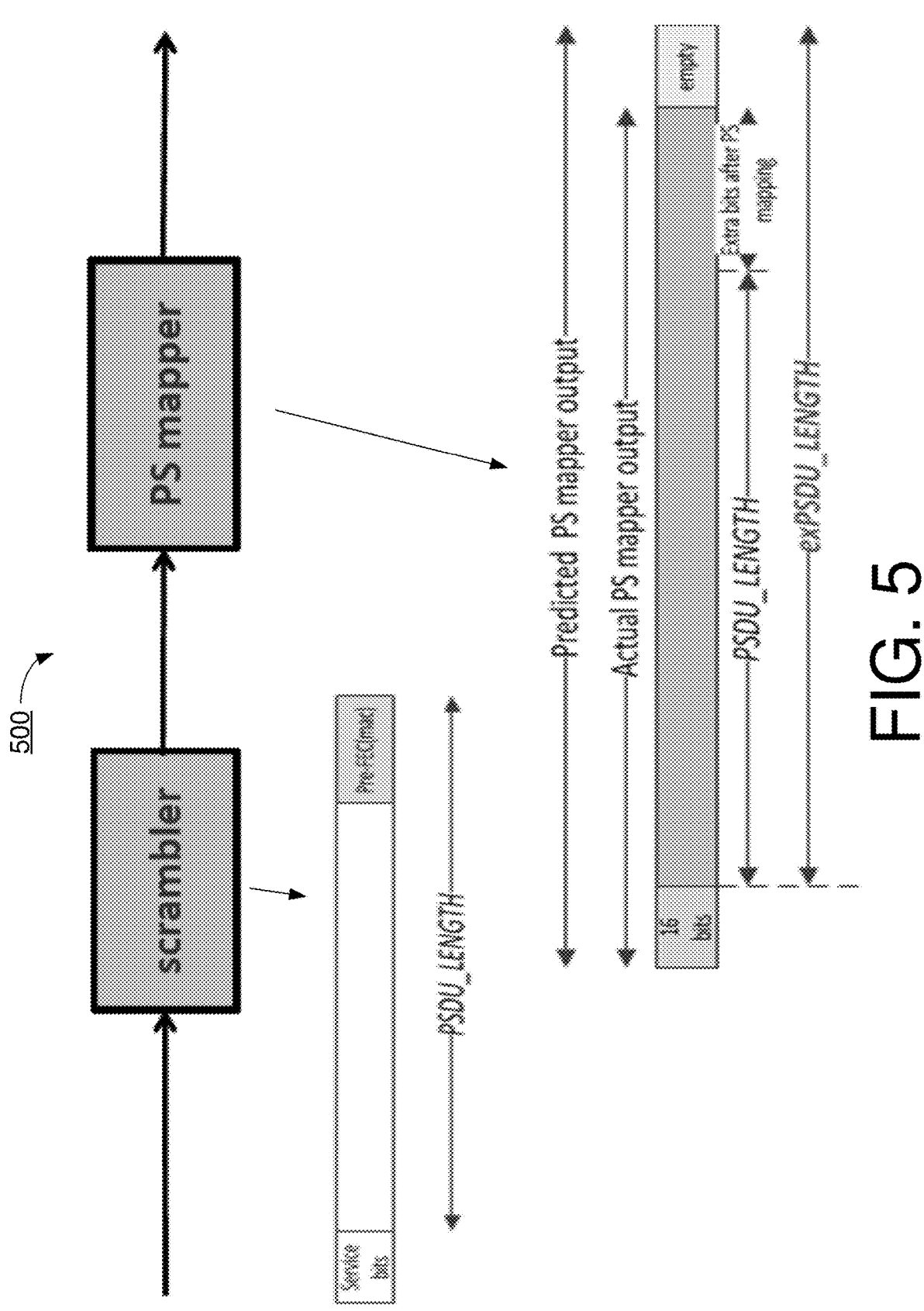
FIG. 5 is a diagram of an example scenario under a proposed scheme in accordance with the present disclosure.

FIG. 5 illustrates an example scenario 500 under a proposed scheme in accordance with the present disclosure. Under the proposed scheme, an extended PSDU length (exPSDU_LENGTH) at the TX side may be calculated as follows:

$$\text{exPSDU\_LENGTH}=[(\text{PSDU\_LENGTH}+2)*(1+\alpha)]-2$$

Then, the calculated exPSDU_LENGTH may be used to replace APEP_LENGTH (or PSDU_LENGTH) to calculate related parameters in the transmission processing. For instance, the "LENGTH" field in L_SIG may be set as follows: $\text{exPSDU\_LENGTH}\rightarrow\{N_{sym}, \text{a-factor, etc.}\}\rightarrow\text{TXTIME}\rightarrow\text{LENGTH}\rightarrow\text{L\_SIG}$.

At the RX side, the exPSDU_LENGTH and PSDU_LENGTH may be calculated following the same procedure as for a regular modulation and coding scheme (MCS) modulation to decode L_SIG and ultra-high reliability (UHR) signal (UHR_SIG), and so on. Based on L_LENGTH, the receiver may calculate $N_{sym,rx}$ and then calculate "exPSDU_LENGTH" using the following equation:

$$exPSDU\_LENGTH = \left\lfloor \frac{\begin{array}{c}(N_{SYM,RX} - m_{STBC})N_{DBPS} + \\ m_{STBC}N_{DBPS,last,RX} - N_{service} - N_{tail}\end{array}}{8} \right\rfloor$$

It is noteworthy that the parameters on the right side of the equation above (to the right of the equal sign) are defined in the IEEE 802.11ax/be specifications.

Once the "exPSDU_LENGTH" is obtained and, by assuming the parameter $\alpha$ is signaled in UHR_SIG or predefined with a fixed value, the actual PSDU_LENGTH may be recovered as follows:

$$PSDU\_LENGTH = \left\lfloor \frac{exPSDU\_LENGTH + 2}{1 + \alpha} \right\rfloor - 2$$

Figure 6:
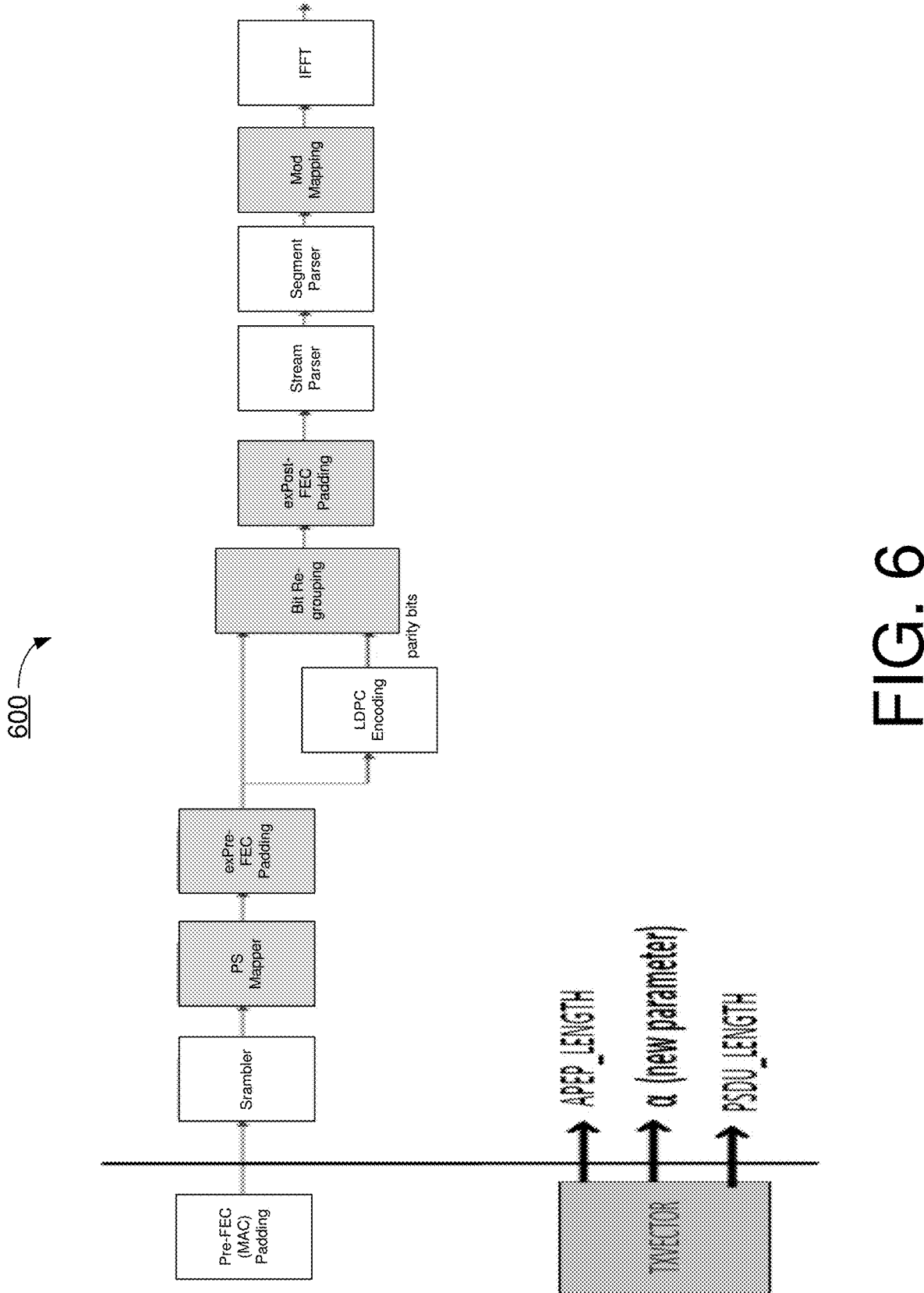
FIG. 6 is a diagram of an example scenario under a proposed scheme in accordance with the present disclosure.

FIG. 6 illustrates an example scenario 600 under a proposed scheme of a processing flow for PS-4KQAM in accordance with the present disclosure. Scenario 600 may pertain to LENGTH signaling and padding processing for PS-4KQAM under the proposed scheme. Referring to FIG. 6, pre-FEC padding may be performed at the MAC layer to provide a PSDU. Then, at the PHY layer, the PSDU may be processed through a scrambler, a PS mapper and an extended pre-FEC (exPre-FEC) padding functional block, with the output of the extended pre-FEC padding functional block fed to a bit regrouping functional block and a low-density parity-check (LDPC) encoder, the output of which is also fed to the bit regrouping functional block. The output of the bit regrouping functional block is then processed through an extended post-FEC (exPost-FEC) padding functional block, a stream parser, a segment parser, a modulation mapping functional block and an inverse fast Fourier transform (IFFT) functional block. Both the extended pre-FEC padding functional block and the extended post-FEC padding functional block utilize the newly introduced parameter $\alpha$.

Under the proposed scheme, the new parameter $\alpha$ may be added in TXVECTOR. The parameter $\alpha$ may be up to a certain number of bits (e.g., two bits), and $\alpha$ may map to a decimal number which may be selected from a predefined set of values. The parameter $\alpha$ may represent the length increase after PS mapping in terms of percentage. The PHY may use PSDU_LENGTH and $\alpha$ to calculate "exPSDU_LENGTH" of the extended PSDU length. The PHY may also use the calculated "exPSDU_LENGTH" to calculate $N_{sym}$, TXTIME, LENGTH, and other parameters, and then PHY may signal LENGTH in L_SIG. The PHY may further perform pre-FEC padding and post-FEC padding based on "exPSDU_LENGTH", using the exact same formula and procedures as for regular MCS modulations.

Figure 7:
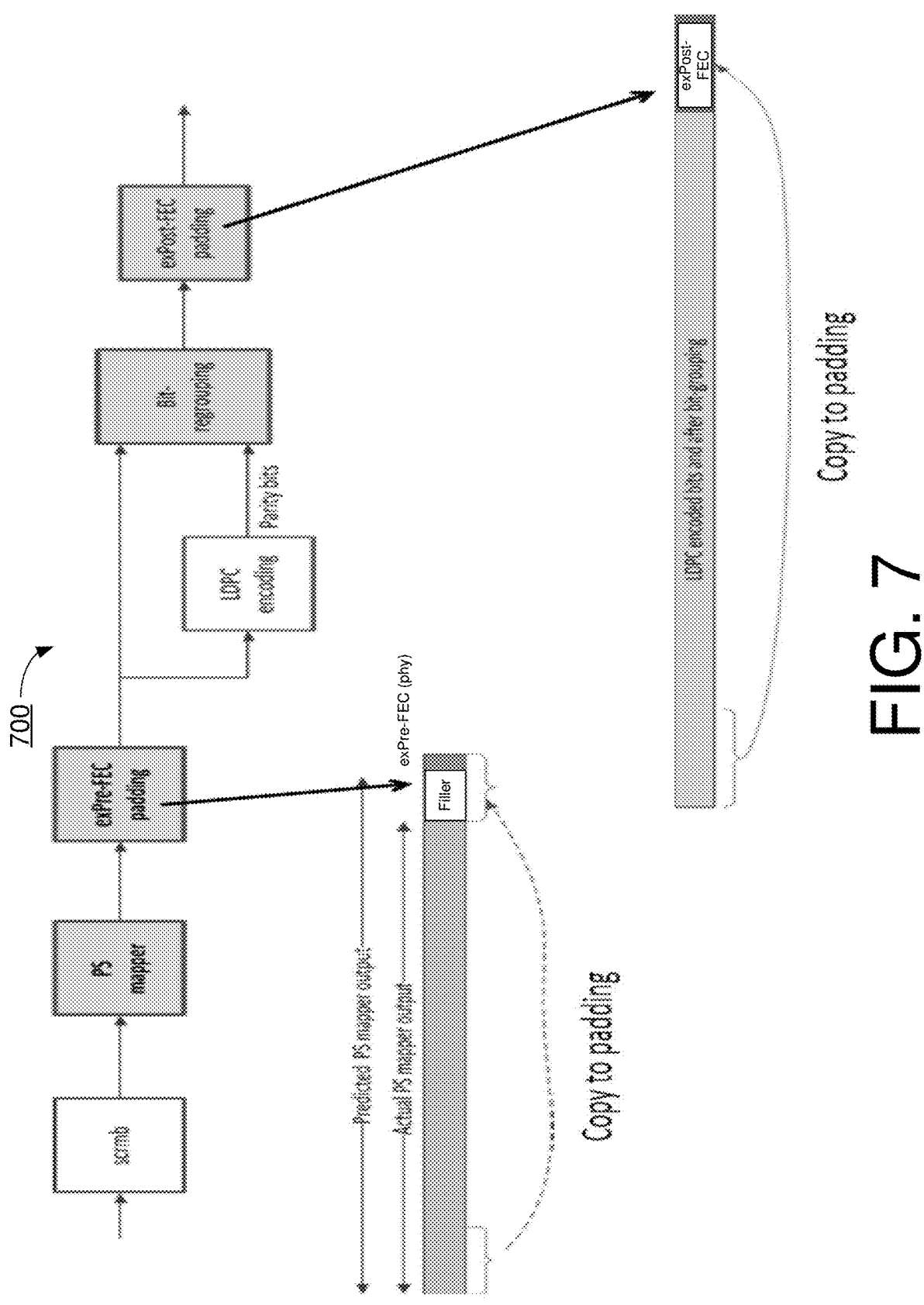
FIG. 7 is a diagram of an example scenario under a proposed scheme in accordance with the present disclosure.

FIG. 7 illustrates an example scenario 700 under a proposed scheme of a processing flow of pre-FEC padding and post-FEC padding for PS-4KQAM in accordance with the present disclosure. Referring to FIG. 7, pre-FEC padding and post-FEC padding may be performed as shown to maintain the special mapping feature(s) of PS-4KQAM.

With respect to extended pre-FEC padding, in an event that the predicted PS mapper output is longer than the actual PS mapper output, then a portion (e.g., front portion) of the actual PS mapper output may be copied and appended at the end as the extended pre-FEC padding. With respect to extended post-FEC padding, in an event that the predicted length is longer than the actual length of LDPC encoded bits and after bit-grouping, then a portion (e.g., front portion) of the LDPC encoded bits and after bit-grouping may be copied and appended at the end as the extended post-FEC padding.

Under a proposed scheme in accordance with the present disclosure with respect to extra signaling to support PS-4KQAM in EHT or UHR systems, an addition of N bits (e.g., two bits) may be added in UHR_SIG to signal the parameter $\alpha$ which represents the length increase of PS mapper, in terms of percentage. Under the proposed scheme, while $\alpha$ may be in the range of 9%~12%, a number of M bits (e.g., two bits) may be utilized to indicate a predefined set of values of $\alpha$. For instance, M bits (e.g., two bits) in UHR_SIG may be used to indicate "x" as follows: "00" for 10%, "01" for 10.5%, "10" for 11% and "11" for 12%. $\alpha$ can also be a predefined value. Under the proposed scheme, both regular 4096QAM (e.g., for base coding rate R=¾ and R=⅚) and PS-4096QAM (e.g., for R=⅚) options may be supported in EHT or UHR. For instance, in the MCS subfields in the UHR_SIG field, regular 4096QAM and PS-4096QAM may correspond to different MCSs. Moreover, under the proposed scheme, separate capability fields may be added for regular 4096QAM and PS-4096QAM. The transmitter may choose the regular 4096QAM and/or PS-4096QAM based on regular 4096QAM capability and PS-4096QAM capability.

Illustrative Implementations

Figure 8:
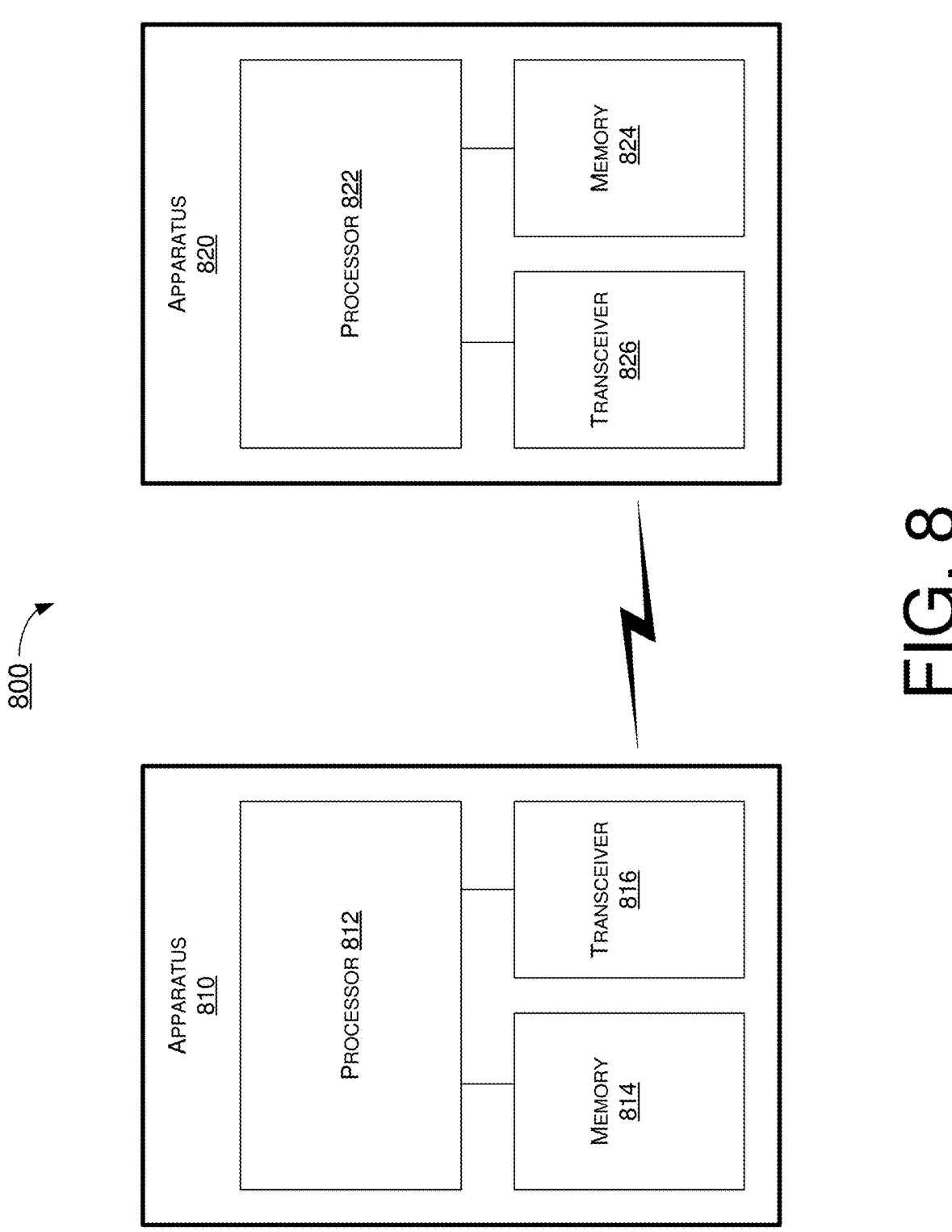
FIG. 8 is a block diagram of an example communication system in accordance with an implementation of the present disclosure.

FIG. 8 illustrates an example system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to signaling and padding methods for probabilistic shaping QAM transmission in wireless communications, including the various schemes described above with respect to various proposed designs, concepts, schemes, systems and methods described above as well as processes described below. For instance, apparatus 810 may be implemented in STA 110 and apparatus 820 may be implemented in STA 120, or vice versa.

Each of apparatus 810 and apparatus 820 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 810 and apparatus 820 may be implemented in a smartphone, a smart watch, a personal digital assistant, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in a network node, such as an AP in a WLAN.

In some implementations, each of apparatus 810 and apparatus 820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 810 and apparatus 820 may be implemented in or as a STA or an AP. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to signaling and padding methods for probabilistic shaping QAM transmission in wireless communications in accordance with various implementations of the present disclosure.

In some implementations, apparatus 810 may also include a transceiver 816 coupled to processor 812. Transceiver 816 may include a transmitter capable of wirelessly transmitting and a receiver capable of wirelessly receiving data. In some implementations, apparatus 820 may also include a transceiver 826 coupled to processor 822. Transceiver 826 may include a transmitter capable of wirelessly transmitting and a receiver capable of wirelessly receiving data. It is noteworthy that, although transceiver 816 and transceiver 826 are illustrated as being external to and separate from processor 812 and processor 822, respectively, in some implementations, transceiver 816 may be an integral part of processor 812 as a system on chip (SoC), and transceiver 826 may be an integral part of processor 822 as a SoC.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM)

and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as STA 110, and apparatus 820, as STA 120, is provided below in the context of example processes 900 and 1000. It is noteworthy that, although a detailed description of capabilities, functionalities and/or technical features of either of apparatus 810 and apparatus 820 is provided below, the same may be applied to the other of apparatus 810 and apparatus 820 although a detailed description thereof is not provided solely in the interest of brevity. It is also noteworthy that, although the example implementations described below are provided in the context of WLAN, the same may be implemented in other types of networks.

Illustrative Processes

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to signaling and padding methods for probabilistic shaping QAM transmission in wireless communications in accordance with the present disclosure. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively, in a different order. Furthermore, one or more of the blocks/sub-blocks of process 900 may be executed repeatedly or iteratively. Process 900 may be implemented by or in apparatus 810 and apparatus 820 as well as any variations thereof. Solely for illustrative purposes and without limiting the scope, process 900 is described below in the context of apparatus 810 implemented in or as STA 110 functioning as a non-AP STA and apparatus 820 implemented in or as STA 120 functioning as an AP STA of a wireless network such as a WLAN in network environment 100 in accordance with one or more of IEEE 802.11 standards. Process 900 may begin at block 910.

At 910, process 900 may involve processor 812 of apparatus 810 generating a packet using PS-4096QAM such that a length of the packet is extended. Process 900 may proceed from 910 to 920.

At 920, process 900 may involve processor 812 transmitting, via transceiver 816, the packet in a wireless communication (e.g., with apparatus 820).

In some implementations, in generating the packet, process 900 may involve processor 812 determining a parameter by which the length of the packet is extended. For instance, the parameter may represent a percentage of an increase in the length of the packet after performing PS mapping relative to a length of an input sequence to the PS mapping.

In some implementations, a value of the parameter may be fixed or configurable. Moreover, the value of the parameter may be in a range of 9%~12% of an original length of the packet.

In some implementations, the packet may include a PSDU. In such cases, the extended length of the packet may be calculated by:

$$exPSDU\_LENGTH=[(PSDU\_LENGTH+2)*(1+\alpha)]-2$$

Here, exPSDU_LENGTH denotes the extended length of the packet, PSDU_LENGTH denotes an original length of the packet, and $\alpha$ denotes the parameter in terms of a percentage of an increase in the length of the packet.

In some implementations, in generating the packet, process 900 may further involve processor 812 performing, based on the extended length of the packet, pre-FEC padding and post-FEC padding after the PS mapping.

In some implementations, in transmitting the packet, process 900 may involve processor 812 transmitting the packet with one or more bits added in a UHR_SIG field of the packet to indicate the parameter which represents the increase in the length of the packet.

Alternatively, or additionally, in transmitting the packet, process 900 may involve processor 812 calculating a number of symbols, a transmission time and a total length using the extended length of the packet. In such cases, in transmitting the packet, process 900 may involve processor 812 indicating the total length of the packet in an L_SIG field of the packet.

In some implementations, in generating the packet, process 900 may involve processor 812 choosing either or both of regular 4096QAM and PS-4096QAM for modulation based on a regular 4096QAM capability and a PS-4096QAM capability of the processor. Moreover, in transmitting the packet, process 900 may involve processor 812 transmitting the packet with MCS subfields in a UHR_SIG field of the packet indicating either or both of the regular 4096QAM and the PS-4096QAM which corresponding to different MCSs.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to signaling and padding methods for probabilistic shaping QAM transmission in wireless communications in accordance with the present disclosure. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively, in a different order. Furthermore, one or more of the blocks/sub-blocks of process 1000 may be executed repeatedly or iteratively. Process 1000 may be implemented by or in apparatus 810 and apparatus 820 as well as any variations thereof. Solely for illustrative purposes and without limiting the scope, process 1000 is described below in the context of apparatus 810 implemented in or as STA 110 functioning as a non-AP STA and apparatus 820 implemented in or as STA 120 functioning as an AP STA of a wireless network such as a WLAN in network environment 100 in accordance with one or more of IEEE 802.11 standards. Process 1000 may begin at block 1010.

At 1010, process 1000 may involve processor 822 of apparatus 820 receiving, via transceiver 826, a packet in a wireless communication (e.g., with apparatus 810). Process 1000 may proceed from 1010 to 1020.

At 1020, process 1000 may involve processor 822 processing the packet which was generated using PS-4096QAM such that a length of the packet is extended.

In some implementations, in processing the packet, process 1000 may involve processor 822 decoding an L_SIG field and a UHR_SIG field of the packet to determine the extended length of the packet.

In some implementations, the packet may include a PSDU. In such cases, in determining the extended length of the packet, process 1000 may involve processor 822 calculating the extended length of the packet by:

$$exPSDU\_LENGTH=[(PSDU\_LENGTH+2)*(1+\alpha)]-2$$

Here, exPSDU_LENGTH denotes the extended length of the packet, PSDU_LENGTH denotes an original length of the packet, and $\alpha$ denotes the parameter in terms of a percentage of an increase in the length of the packet.

In some implementations, the parameter may represent a percentage of an increase in the length of the packet after PS mapping is performed at a transmitter side relative to a length of an input sequence to the PS mapping.

In some implementations, a value of the parameter may be fixed or configurable. Moreover, the value of the parameter may be in a range of 9%~12% of an original length of the packet.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    generating, by a processor of an apparatus, a packet using probabilistic shaping (PS) 4096 quadrature amplitude modulation (4096QAM) such that a length of the packet is extended from an original length to an extended length; and
transmitting, by the processor, the packet in a wireless communication,
wherein the generating of the packet comprises determining a parameter by which the length of the packet is to be extended,
wherein the parameter represents a percentage of an increase in a length of a bit sequence being output by a PS mapper compared to a length of a bit sequence input to the PS mapper,
wherein a value of the parameter is fixed or configurable,
wherein the packet comprises a physical layer convergence protocol (PLCP) service data unit (PSDU),
wherein the generating of the packet further comprises calculating the extended length of the packet by:

$$\text{exPSDU\_LENGTH} = [(\text{PSDU\_LENGTH} + 2) * (1 + \alpha)] - 2$$

wherein:
    exPSDU_LENGTH denotes the extended length of the packet,
    PSDU_LENGTH denotes an original length of the packet, and
    $\alpha$ denotes the parameter in terms of a percentage of an increase in the length of the packet.

2. The method of claim 1, wherein a value of the parameter is in a range of 9%~12% of an original length of the packet.

3. The method of claim 1, wherein the generating of the packet further comprises performing, based on the extended length of the packet, pre-forward error correction (pre-FEC) padding and post-FEC padding after the PS mapping.

4. The method of claim 1, wherein the transmitting of the packet comprises transmitting the packet with one or more bits added in a ultra-high reliability (UHR) signal (UHR_SIG) field of the packet to indicate the parameter which represents the increase in the length of the packet.

5. The method of claim 1, wherein the transmitting of the packet comprises calculating a number of symbols, a transmission time and a total length using the extended length of the packet, and wherein the transmitting of the packet comprises indicating the total length of the packet in a legacy signal (L_SIG) field of the packet.

6. The method of claim 1, wherein the generating of the packet further comprises choosing either or both of regular 4096QAM and PS-4096QAM for modulation based on a regular 4096QAM capability and a PS-4096QAM capability of the processor.

7. The method of claim 6, wherein the transmitting of the packet comprises transmitting the packet with modulation and coding scheme (MCS) subfields in a ultra-high reliability (UHR) signal (UHR_SIG) field of the packet indicating either or both of the regular 4096QAM and the PS-4096QAM which corresponding to different MCSs.

8. A method, comprising:
    receiving, by a processor of an apparatus, a packet in a wireless communication; and
    processing, by the processor, the packet which was generated using probabilistic shaping (PS) 4096 quadrature amplitude modulation (4096QAM) such that a length of the packet is extended from an original length to an extended length,
    wherein the processing of the packet comprises decoding a legacy signal (L_SIG) field and an ultra-high reliability (UHR) signal (UHR SIG) field of the packet to determine the extended length of the packet.

9. The method of claim 8, wherein the packet comprises a physical layer convergence protocol (PLCP) service data unit (PSDU), and wherein the determining of the extended length of the packet comprises calculating the extended length of the packet by:

$$exPSDU\_LENGTH=[(PSDU\_LENGTH+2)*(1+\alpha)]-2$$

wherein:

exPSDU_LENGTH denotes the extended length of the packet,

PSDU_LENGTH denotes an original length of the packet, and $\alpha$ denotes a parameter in terms of a percentage of an increase in the length of the packet.

10. The method of claim 9, wherein the parameter represents a percentage of an increase in the length of the packet after PS mapping is performed at a transmitter side relative to a length of an input sequence to the PS mapping.

11. The method of claim 9, wherein a value of the parameter is fixed or configurable.

12. The method of claim 9, wherein a value of the parameter is in a range of 9%~12% of an original length of the packet.

13. An apparatus, comprising:

a transceiver configured to communicate wirelessly; and a processor coupled to the transceiver and configured to perform operations comprising:

generating a packet using probabilistic shaping (PS) 4096 quadrature amplitude modulation (4096QAM) such that a length of the packet is extended; and transmitting, via the transceiver, the packet in a wireless communication, wherein the generating of the packet comprises determining a parameter by which the length of the packet is to be extended, wherein the parameter represents a percentage of an increase in a length of a bit sequence being output by a PS mapper compared to a length of a bit sequence input to the PS mapper, wherein a value of the parameter is fixed or configurable, wherein the packet comprises a physical layer convergence protocol (PLCP) service data unit (PSDU), wherein the generating of the packet further comprises calculating the extended length of the packet by:

$$exPSDU\_LENGTH=[(PSDU\_LENGTH+2)*(1+\alpha)]-2$$

wherein:

exPSDU_LENGTH denotes the extended length of the packet,

PSDU_LENGTH denotes an original length of the packet, and $\alpha$ denotes the parameter in terms of a percentage of an increase in the length of the packet.

14. The apparatus of claim 4, wherein a value of the parameter is in a range of 9%~12% of an original length of the packet.

15. The apparatus of claim 14, wherein the generating of the packet further comprises performing, based on the extended length of the packet, pre-forward error correction (pre-FEC) padding and post-FEC padding after the PS mapping, and wherein the transmitting of the packet comprises transmitting the packet with one or more bits added in a ultra-high reliability (UHR) signal (UHR_SIG) field of the packet to indicate the parameter which represents the increase in the length of the packet.

* * * * *